US010965088B2

(12) United States Patent
Heckl et al.

(10) Patent No.: US 10,965,088 B2
(45) Date of Patent: Mar. 30, 2021

(54) DUAL-COMB GENERATION FROM A SINGLE LASER CAVITY VIA SPECTRAL SUBDIVISION

(71) Applicant: Thorlabs, Inc., Newton, NJ (US)

(72) Inventors: Oliver H. Heckl, Vienna (AT); Georg Winkler, Klosterneuburg-Weidling (AT); Jakob Fellinger, Pettneu am Arlberg (AT)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 16/296,586

(22) Filed: Mar. 8, 2019

(65) Prior Publication Data
US 2019/0280450 A1 Sep. 12, 2019

(30) Foreign Application Priority Data

Mar. 9, 2018 (EP) .................................. 18160878

(51) Int. Cl.
*H01S 3/098* (2006.01)
*H01S 3/08* (2006.01)
(Continued)

(52) U.S. Cl.
CPC ............ *H01S 3/0804* (2013.01); *H01S 3/067* (2013.01); *H01S 3/06712* (2013.01);
(Continued)

(58) Field of Classification Search
CPC ............ H01S 3/06712; H01S 3/06791; H01S 3/10007; H01S 3/10061; H01S 3/11;
(Continued)

(56) References Cited

U.S. PATENT DOCUMENTS 4,009,391 A 2/1977 Janes et al.
5,311,606 A 5/1994 Asakura
(Continued)

FOREIGN PATENT DOCUMENTS

CN 101023388 A 8/2007
CN 101504474 A 8/2009
(Continued)

OTHER PUBLICATIONS

Extended European Search Report issued for corresponding European Patent Application No. EP18160878.7 dated Aug. 23, 2018.
(Continued)

*Primary Examiner* — Kinam Park
(74) *Attorney, Agent, or Firm* — Myers Wolin, LLC

(57) ABSTRACT

A method for generating a single-cavity dualcomb or multicomb for laser spectroscopy, the method comprising the steps of providing a laser system comprising a pump source, a gain medium, and a resonator having a spectral filter; spectrally filtering, by the spectral filter, light in the resonator and attenuating, in particular blocking, by the spectral filter, one or more wavelength bands at least one of which being located completely within the gain bandwidth of the laser system such that two or more at least partially separated spectral regions are provided; mode-locking the two or more at least partially separated spectral regions.

20 Claims, 5 Drawing Sheets

(51) Int. Cl.
*H01S 3/067* (2006.01)
*H01S 3/10* (2006.01)
*H01S 3/11* (2006.01)
*H01S 3/13* (2006.01)
*H01S 3/16* (2006.01)

(52) U.S. Cl.
CPC ...... *H01S 3/06791* (2013.01); *H01S 3/10007* (2013.01); *H01S 3/10061* (2013.01); *H01S 3/11* (2013.01); *H01S 3/1112* (2013.01); *H01S 3/13* (2013.01); *H01S 3/06716* (2013.01); *H01S 3/0805* (2013.01); *H01S 3/1118* (2013.01); *H01S 3/1618* (2013.01); *H01S 2301/08* (2013.01)

(58) Field of Classification Search
CPC ........ H01S 3/1112; H01S 3/13; H01S 3/0805; H01S 3/1118; H01S 3/1618; H01S 3/067; H01S 3/06716; H01S 3/0804; H01S 2301/08
See application file for complete search history.

(56) References Cited

U.S. PATENT DOCUMENTS

| | | | | |
|---|---|---|---|---|
| 2004/0264977 | A1* | 12/2004 | Yap | G02F 2/02 398/161 |
| 2006/0120418 | A1* | 6/2006 | Harter | H01S 3/1643 372/30 |
| 2012/0327960 | A1* | 12/2012 | Wise | H01S 3/06725 372/6 |
| 2016/0097963 | A1 | 4/2016 | Fermann et al. | |
| 2017/0365974 | A1 | 12/2017 | Kurtz et al. | |

FOREIGN PATENT DOCUMENTS

| | | |
|---|---|---|
| CN | 105814476 A | 7/2016 |
| CN | 107078465 A | 8/2017 |
| CN | 107104353 A | 8/2017 |
| JP | 2009266894 A | 11/2009 |
| WO | 2004054054 A1 | 6/2004 |
| WO | 2015056050 A1 | 4/2015 |

OTHER PUBLICATIONS

Jutta Mildner et al: "Dual-frequency comb generation with differing GHz repetition rates by parallel Fabry-Perot cavity filtering of a single broadband frequency comb source", Measurement Science and Technology, IOP, Bristol, GB, vol. 27, No. 7, May 31, 2016 (May 31, 2016), p. 74011, XP020305623, ISSN: 0957-0233, DOI: 10.1088/0957-0233/27/7/074011 (published on May 31, 2016) *p. 1-p. 3; figure 1*.

Sandro Link et al: "Dual-comb modelocked lasers generated from a single source", SPIE Newsroom, Mar. 31, 2016 (Mar. 31, 2016), XP055498776, DOI: 10.1117/2.1201602.006350 *abstract; figures 2, 3*.

Office Action with Search Report, dated Jul. 30, 2020, issued by the Chinese Patent Office for corresponding Chinese Patent Application No. 201910176475.9, filed on Mar. 9, 2018.

Communication pursuant to Article 94(3) EPC issued by the European Patent Office for corresponding European Patent Application No. 18160878.7, dated Jun. 5, 2020.

* cited by examiner

DUAL-COMB GENERATION FROM A SINGLE LASER CAVITY VIA SPECTRAL SUBDIVISION

FIELD OF THE INVENTION

The present invention relates to the field of laser spectroscopy and a corresponding laser system.

BACKGROUND OF THE INVENTION

Recently, dual comb, DC, spectroscopy has emerged as a versatile technique combining the advantages of conventional broadband spectroscopy and tunable laser spectroscopy, cf. SCHILLER, Optics Letters, Vol. 27, No. 9, May 1, 2002; IDEGUCHI, T., Optics and Photonics News; Vol. 28; Issue 1; pp. 32-39; Jan. 1, 2017. By using a dualcomb there is no need for a complicated and expensive detector assembly like a virtually imaged phase array or a Fourier transform spectrometer. However, such systems traditionally consist of two identical mode locked lasers, actively stabilized to each other, often leading to an expensive and complex systems, cf. CODDINGTON, I et al, Phys. Rev. Lett. 100, 013902, January 2008, see also CODDINGTON, I et al, Optica Vol. 3, No. 4, 414, April 2016. Various approaches were demonstrated to generate two pulse trains using a single laser cavity, aiming at passive mutual coherence due to common-mode noise cancellation in the down-converted radio frequency comb, cf. LINK, S. M. et al, Opt. Express 23, 5521-5531, Mar. 9, 2015. However, such single-cavity dual-comb sources are usually designed for specific types of oscillators and are difficult to implement in other types of lasers. To summarize, a clear drawback of dual comb sources is the often complicated and expensive oscillator design or the need for two mutually coherent optical frequency combs.

SUMMARY OF THE INVENTION

In view of the above, the present invention provides an alternative solution to the above-mentioned limitations.

The present disclosure discloses a powerful and easily implementable method for generating a dualcomb or a multicomb from a single source. It should be understood that typically a laser comprises a pump, a gain medium, and a resonator. Sometimes, the terms oscillator or cavity are also used to refer to the resonator and gain medium but excluding the pump. By manipulating cavity losses for different spectral portions of the gain spectrum, the present disclosure discloses providing at least two frequency combs originating from the same laser. In the following the terms spectral parts and spectral portions are used synonymously.

According to the present invention, it is provided:

A method for generating a single-cavity dualcomb or multicomb for laser spectroscopy, the method comprising the steps of: providing a laser system comprising a pump source, a gain medium, and a resonator having a spectral filter; spectrally filtering, by the spectral filter, light in the resonator and attenuating, in particular blocking, by the spectral filter, one or more wavelength bands at least one of which being located completely within the gain bandwidth of the laser system such that two or more at least partially separated spectral regions are provided; and mode-locking the two or more at least partially separated spectral regions.

A laser beam is a commonly available coherent light source. For a laser beam in general it need not be pulsed and no optical resonators need to be used. For the practical purpose of creating a frequency comb, however, it will have to be pulsed. Coupling equipment such as fibers may be used. Such equipment is well understood. For instance, single mode fibers may be used to couple the elements of the laser system. In the laser system, it is well understood that it is necessary to in-couple pump light from the pump source into the gain medium; to out-couple light from the gain medium to the spectral filter and to in-couple light manipulated by the spectral filter to the gain medium. It should be also understood that light, in particular amplified light, typically is out-coupled from the resonator.

A gain bandwidth of the laser system represents the entire possible spectral bandwidth of wavelengths of the laser system. By introducing a spectral filter, the gain of a part or of parts of the spectrum can be attenuated or even blocked such that at least two at least partially separated gain regions, i.e. spectral regions, are generated by the introduction of the spectral filter. For the purpose of the present disclosure, at least one of these attenuated and/or blocked parts of the spectrum should be located completely with the gain bandwidth of the laser system. Locating the attenuated or blocked parts completely within the gain bandwidth of the laser system thus should provide that at least two at least partially separated spectral regions. These spectral regions may correspond to a corresponding number of gain maxima. In other words, edges of the spectrum should not be attenuated or blocked. Thus, by attenuating or even blocking a part or parts of the spectrum, the laser spectrum can be intentionally manipulated. Whereas often the attenuating or blocking will include the central part of the gain bandwidth, i.e. the middle of the gain bandwidth, also non-central parts may be attenuated or blocked.

The subsequent modelocking step then allows for the creation of at least two (or a number corresponding to the number of spectral regions) modelocked lasers at slightly different repetition rates, respectively. A positive or negative cavity dispersion will enable the possibility for obtaining different repetition rates. In other words, it is possible to independently modelock the laser within these separated spectral regions.

The method may further comprise the step of stabilizing the generated dualcomb or multicomb with respect to their repetition rates and offset frequencies, respectively.

It is understood that the two or more modelocked lasers, here also called dualcombs, multicombs, frequency combs and the like, can be stabilized with respect to their respective repetition rates and offset frequencies hence creating phase stable and stabilized frequency combs.

The method may further comprise the step of spectrally overlapping, by a non-linear medium, e.g. at least one of a crystal, a fiber, a glass, or a gaseous medium, the at least two at least partially separated spectral regions of the laser spectrum, thereby obtaining a spectrally overlapped dualcomb or multicomb, respectively.

Technically, non-linear fibers are very often used. A non-linear fiber, in particular a highly non-linear fiber, for spectrally overlapping the at least two partially separated spectral regions of the laser spectrum may be based on photonic crystal fiber and may be optimized in its dispersive behavior. A non-linear medium may include a non-linear crystal. Examples for such crystals are (periodically poled) potassium titanyl phosphate, (pp)KTP, (periodically poled) Lithium-Niobate, (pp)LN, (periodically poled) stoichiometric lithium tantalate (pp)SLT, barium borate BBO, lithium triborate LBO, bismuth borate BiBO, and potassium dihydrogen phosphate KDP. It should be understood that this list is not exhaustive. The non-linear crystal may be periodically poled for enhanced efficiency. However, having periodically poled crystals is not a prerequisite. In particular, bulk crystals may be used. It should be understood that other non-linear media, including higher-order non-linear media may be used.

In the method the step of mode-locking the two or more at least partially separated spectral regions may further comprise the step of manipulating resonator losses of the light dependent on its peak intensity; in particular wherein manipulating resonator losses may comprise: manipulating the polarization of the light out-coupled from the gain medium before entering the spectral filter, and manipulating the polarization of the light manipulated by the spectral filter before re-entering the gain medium.

By manipulating, in particular reducing resonator losses, the phase coherence of the modes of the laser is improved. This may, in particular, comprise manipulation of the light out-coupled from the gain medium before entering the spectral filter and manipulation of the light which is manipulated by the spectral filter before re-entering the gain medium. It should be understood that manipulation of the polarization may be achieved by using one or more of well understood polarizers such as quarter wave plates and/or half wave plates. Polarization beam splitters and polarizers may be used, as well.

In the method the spectral filter may comprise one or more of a grating compressor, dielectric mirrors, fiber Bragg grating, prism compressors, or absorptive filters.

In the method the step of spectrally filtering may comprise spatially dispersing, by the spectral filter, the light in the resonator, in case the spectral filter comprises one or more of a grating compressor or absorptive filters.

The spectral filtering by the spectral filter may be implemented in various ways. If dielectric mirrors are used, the spectral filter may not exhibit a substantial amount of dispersion. It should be understood that there will always be some, often negligible, amount of dispersion due to the Kramer-Kronig relation. If, however, a grating compressor, or prism compressor is used, the spectral filter may additionally enable spatial dispersing of the light in the spectral filter. Then, the overall dispersion of the cavity may be chosen to be slightly negative or else slightly positive but unequal to zero. Thereby, effectively a different resonator length for different wavelengths may be accomplished. This may lead to different repetition rates. It should be understood, that the dispersion only within the spectral filter may be significant off zero because it may be used to compensate the cavity dispersion. However, the spectral filter may be used to control dispersion of the entire cavity. Thus, the resulting dispersion of the entire cavity may be controlled to be slightly off zero.

The spectral filter may comprise at least one attenuator for attenuating, in particular blocking, a wavelength band located completely within the gain bandwidth of the laser system thereby providing at least two at least partially separated spectral regions of the laser spectrum, respectively. The attenuator may comprise one or more geometrical objects such as blocks or cylinders which may be translated so as to attenuate or block parts of the gain bandwidth. By translating the attenuator or blocking element, it may be positioned with respect to the beam of light. Translation may be achieved manually or using well understood translation stages. The attenuator or blocking element may thus present an obstacle for the beam within the spectral filter.

The method may further comprise the steps of: modulating the carrier envelope of the laser spectrum by the unidirectional feeding of the light back into the gain medium; amplifying the light out-coupled from the resonator and compressing the amplified light in the time domain by another grating compressor.

Modulation of the carrier envelope or modulating, i.e. controlling the carrier-envelope offset, i.e. the offset of the envelope with respect to the carrier may be beneficial for stabilization of the comb or combs. The frequency domain representation of a perfect frequency comb is a series of delta functions which may be described by $f_n = f_0 + n \cdot f_r$, where n is an integer, $f_r$ is the comb tooth spacing which corresponds to the mode-locked laser's repetition rate or, alternatively, the modulation frequency, and $f_0$ is the carrier offset frequency, which lies between zero and is less than $f_r$. A dualcomb or multicomb will have corresponding degrees of freedom. The two degrees of freedom, $f_r$ and $f_0$, of the comb or correspondingly for each comb may be stabilized to benefit the generation of a comb or combs which are useful for precision measurement. Modulation of the carrier envelope may entail the use of a corresponding modulator such as an electro-optical modulator, EOM.

By amplifying the light out-coupled from the resonator the average power and pulse energy of the light will be adapted to the needs of the intended applications. Further, by compressing the amplified light in the time domain, the per pulse power of the light, in particular the peak pulse power, may be tuned.

In the method, the gain medium is a doped fiber, doped crystal or doped glass, in particular doped by one of Yb, Er, Ti, Ho, Nd, Pr, Tm; and the laser system comprises a nonlinear polarization evolution, NPE, laser, or nonlinear amplifying loop mirror, NALM, laser.

According to the present invention, it is further provided: a laser system for generating a single-cavity dualcomb or multicomb for laser spectroscopy, comprising: a pump source, a gain medium, and a resonator; the resonator comprising a spectral filter for spectrally filtering light in the resonator and for attenuating one or more wavelength bands at least one of which being located completely within the gain bandwidth of the laser system such that two or more at least partially separated spectral regions are provided; and means for mode-locking the two or more at least partially separated spectral regions.

The advantages of the laser system have already been discussed with respect to the corresponding method. As indicated, typical coupling components such as fibers may be used to couple the elements of the laser system. For instance, single mode fibers may be used to couple the various discrete elements of the laser system. In the laser system, various means are well understood for in-coupling of the pump light, to out-couple light from the gain medium to the spectral filter, and to in-couple light manipulated by the spectral filter to the gain medium. It should be also understood that light, in particular amplified light, is typically out-coupled from the resonator. For instance, a wavelength division multiplexer, WDM, may be used for in-coupling pump light from the pump source into the gain medium. Also, a first coupling element such as a first collimator may be used for out-coupling light from the gain medium to the spectral filter. Also, a second coupling element such as a second collimator may be used for in-coupling the light manipulated by the spectral filter to the gain medium.

The laser system may further comprise means for stabilizing the generated dualcomb or multicomb with respect to their repetition rates and offset frequencies, respectively.

The laser system may further comprise a non-linear fiber for spectrally overlapping the at least two at least partially separated spectral regions of the laser spectrum, thereby obtaining a spectrally overlapped dualcomb or multicomb, respectively.

The combs forming the dualcomb or multicomb out-coupled from the laser system may be overlapped so as to form a resulting overlapped comb to be used for the intended applications. This may eventually result in forming a down-converted radio frequency, RF, comb.

In the laser system the gain medium may be a doped fiber, doped crystal or doped glass, in particular doped by one of Yb, Er, Ti, Ho, Nd, Pr, Tm; and the laser system may comprise one of an ultra-short pulse fiber laser based on the Kerr effect, in particular one of a nonlinear polarization evolution, NPE, laser, a nonlinear amplifying loop mirror, NALM, laser or a Kerr-lens mode-locking, KLM, laser, or a saturable absorber, e.g. a SESAM or graphene modelocked laser.

The laser system may further comprise a manipulator for manipulating intensity losses of the light dependent on its peak power/peak intensity; in particular the manipulator may comprise: a first polarization manipulator for manipulating the polarization of the light out-coupled from the gain medium before entering the spectral filter, and a second polarization manipulator for manipulating the polarization of the light manipulated by the spectral filter before re-entering the gain medium; or a saturable absorber to establish mode-locking; or an aperture and a Kerr lens to establish Kerr-lens mode-locking.

In the laser system the spectral filter may comprise at least one attenuator for attenuating, in particular blocking, a wavelength band located completely within the gain bandwidth of the laser system, thereby providing at least two at least partially separated spectral regions of the laser spectrum, respectively.

The attenuator may comprise one or more geometrical objects such as blocks or cylinders, wedge-shaped object or even thin razor-blade like objects. These objects which may be translated so as to attenuate or block parts of the gain spectrum. These one or more objects may present an obstacle for the beam within the spectral filter.

In the laser system wherein the spectral filter may comprise one or more of a grating compressor, dielectric mirrors, or absorptive filters; and optionally the grating compressor may comprise a pair of gratings for spectrally dispersing the light in the resonator and a reflector for reflecting the dispersed light back onto the gratings.

The laser system may further comprise: an electro optical modulator, EOM, for modulating the carrier envelope of the laser spectrum; and at least one Faraday isolator for unidirectional feeding of the light back into the gain medium. The laser system may further comprise an amplifier for amplifying the light out-coupled from the resonator and another grating compressor for compressing the amplified light in the time domain.

The above and other aspects, features and advantages of the present invention will become more apparent from the following detailed description when taken in conjunction with the accompanying drawings.

DETAILED DESCRIPTION

Figure 1:
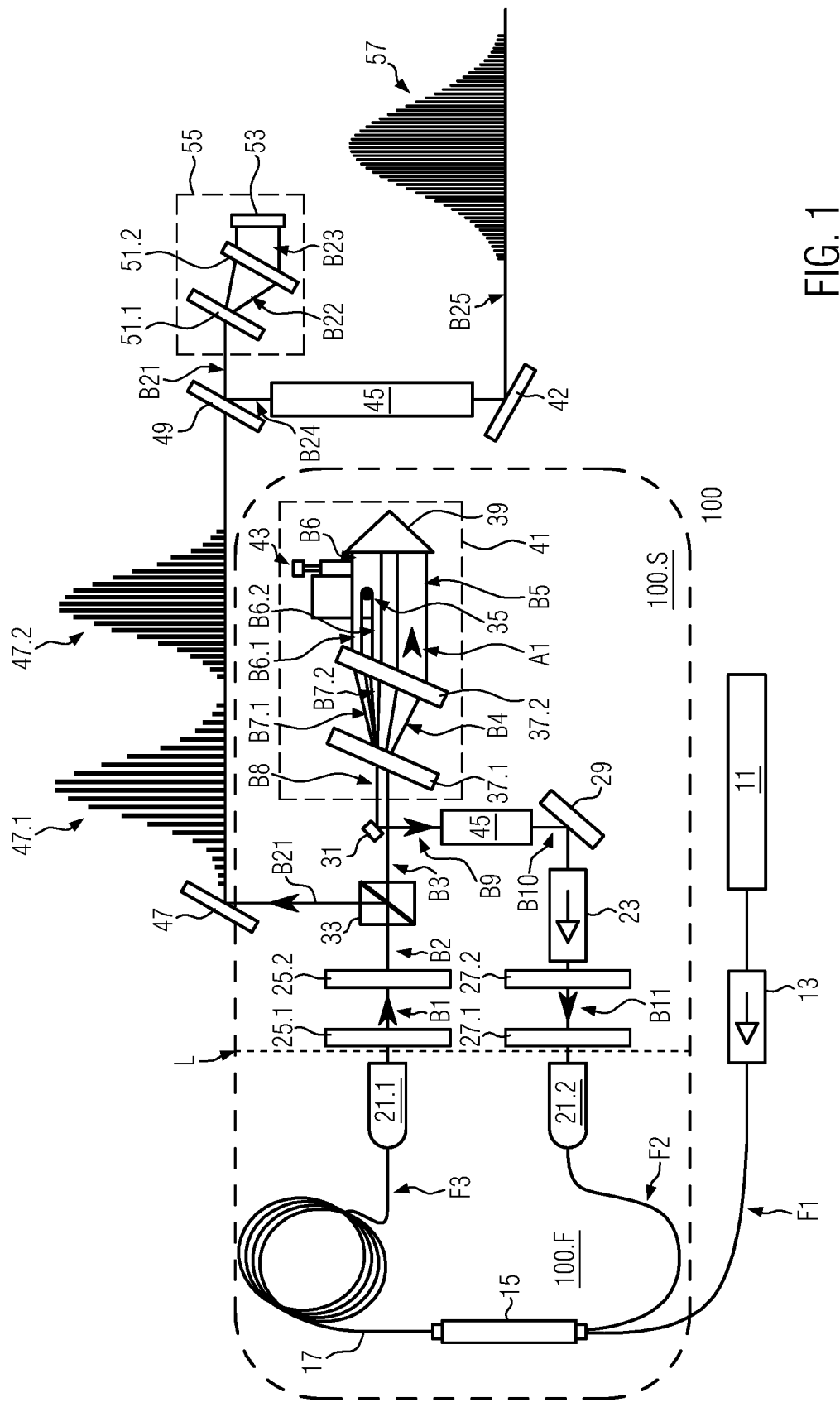
FIG. 1: A system according to a first embodiment of the present disclosure.

FIG. 1 discloses a laser system 200 according to the present disclosure. The laser system 200 of FIG. 1 comprises a resonator 100, a pump source 11 and a gain medium 17. As indicated in FIG. 1, the resonator 100 comprises a spectral filter 41. For explanatory purposes only, the resonator 100 may be illustrated comprising a free space part 100.S and a fiber part 100.F. Thus, in the fiber part 100.F, light is guided with fibers. In the free space part 100.S, light is not guided by fibers but travels through the space between elements comprised in the free space part 100.S of the resonator 100. In FIG. 1, the free space part 100.S and the fiber part 100.F are shown to be separated by dashed line L. It should be understood, however, that dashed line L is merely drawn for illustrational and explanatory purposes.

In FIG. 1, the pump source 11 may be a pump source chosen for the intended application. For example, the pump source 11 may comprise a pump laser such as a 976 nm pump laser. Other pump lasers may be used corresponding to the respective pump wavelength of the active medium. Energy from the pump source 11 may be called pump energy or pump light. Such pump light is typically coupled into the resonator 100 via fibers such as the fiber F1 shown in FIG. 1. The fiber F1 may typically be a single mode fiber for better bandwidth. This should correspond to the type of the gain medium, i.e. the gain fiber. Thus, if the fiber F1 is a single mode fiber, the gain medium should also be a single mode gain fiber. Additionally, an isolator 13 such as a Faraday isolator may be used between pump source 11 and the resonator for ensuring unidirectional operation and transmission of the pump light. This may benefit isolation and protection of the pump from unwanted feedback from the laser. This thus benefits separating light from the pump laser and light from the resonator. The resonator 100, in its fiber part 100. F may involve a wavelength division multiplexer, WDM, 15 for improving in-coupling of the pump light from the pump source 11 and received by the fiber F1 into the resonator.

In FIG. 1, the laser system 200 may comprise an ultra-short pulse fiber laser based on the Kerr effect or saturable absorber for modelocking, in particular one of a nonlinear polarization evolution, NPE, laser, a nonlinear amplifying loop mirror, NALM, laser or a Kerr-lens mode-locking, KLM, laser. These types of lasers may be further modified. In particular, FIG. 1 discloses a modified NPE laser. The saturable absorber may involve a SESAM or graphene modelocked laser.

In FIG. 1, the resonator 100 further comprises a gain medium 17. The gain medium may be a doped fiber, doped crystal or doped glass. In particular dopants may be one or more of Yb, Er, Ti, Ho, Nd, Pr, or Tm. For the embodiment of FIG. 1 the gain medium 17 comprises an Ytterbium doped gain fiber. The gain medium, here the Yb doped gain fiber, may also be referred to as the laser medium or lasing medium, is the source of optical gain within a laser. As is well understood, the gain results from the stimulated emission of radiation when transitioning to a lower energy state from a higher energy state previously populated by pump energy provided by an external pump source. The gain medium 17 thus serves as an optical amplifier for the light entering into the gain medium 17. In FIG. 1, after the light is emitted by the gain medium 17 it may enter another single mode fiber F3. The single mode fiber F3 is a non-polarization maintaining single mode fiber which provides for the non-linear polarization evolution within the context of the NPE laser. Further, as indicated in FIG. 1, after passing the fiber F3, which is still located in the fiber part 100.F, the light is coupled into the free space portion 100.S. using at least one collimator 21.1. Having entered the free space portion 100.S of the resonator 100, polarization manipulation of the light, i.e. tuning of the light may be accomplished by using at least a pair of a quarter wave plate 25.1 and a half wave plate 25.2 right after the first collimator 21.1. A polarization beam splitter may also be used additionally or alternatively. The light, which in free space may also be referred to as light beam, between the elements 25.1 and 25.2 is referenced by B1. Light which has passed both quarter wave plate 25.1 and a half wave plate 25.2 is denoted by B2 and B3, respectively. Such light is then received by the spectral filter 41, see below. In a symmetrical way, after having modified, e.g. spectrally filtered the light B3 which entered the spectral filter, 41, modified light B8 and B9 emitted from the spectral filter 41 passes through at least another pair of polarization manipulators such as a quarter wave plate 27.1 and a half wave plate 27.2 for further tuning before reentering the fiber part 100.F of the resonator 100. It should be appreciated that the order of the wave plate 27.1 and 27.2, or 27.2 and 27.1 does not matter. It should be appreciated that in principle a minimal set of just a quarter wave plate may be sufficient. Here the quarter wave plate 27.1 and the half wave plate 27.2 may be substantially similar to the quarter wave plate 25.1 and the half wave plate 25.2, respectively. Here, light between the quarter wave plate 27.1 and the half wave plate 27.2 is denoted by B11. Similar to the first collimator 21.1, a second collimator 21.2 is used to in-couple the light B11 back into the fiber part 100.F and towards re-entering the gain medium 17. Another single mode fiber F2 may be used as a light guide between the second collimator 21.2 and the gain medium 17. The first and the second collimator may be similar.

In other words, in the free space portion 100.S of the resonator 100, manipulating the intensity losses of the light dependent on its peak intensity is performed. Thus, the intensity dependent change happens in the fiber part 100.F. In particular manipulating intensity losses comprises manipulating the polarization of the light B2, B3, out-coupled from the gain medium 17 by means of collimator 21.1, before said light B2, B3 enters the spectral filter 41, and manipulating the polarization of the light B8, B9, B10 manipulated by the spectral filter 41 before re-entering the gain medium 17. As shown in FIG. 1, another Faraday isolator 23 may be used to ensure unidirectional operation of the light in the resonator 100, in particular B8, B9, before impinging onto the quarter wave plate 27.1 and the half wave plate 27.2. As indicated above, the order of 27.1 and 27.2 may be reversed. As is indicated in FIG. 1, an electro-optical modulator, EOM, 45 may be inserted into the path of the light beam as modified by and emitted from the spectral filter. Said EOM 45 may be utilized for modulation of the carrier envelope offset of the light and also for providing further stabilization of frequency comb. The further stabilized light beam is denoted by B10.

Instead of the sequence of quarter wave plate 25.1 and half wave plate 25.2, as well as quarter wave plate 27.1 and half wave plate 27.2, a different means for establishing mode-locking may be used. In particular, other artificial saturable absorbers may be used like an aperture and a Kerr medium serving as a Kerr lens to establish Kerr-lens mod-elocking, or a NALM. Yet another possibility may be the use of saturable absorbers like a SESAM or graphene-based absorbers in modelocked lasers.

As is further disclosed in FIG. 1, light is coupled out of the cavity by means of an out-coupling element. In particular, by inserting a polarization beam splitter 33, a part of the light beam B2 is coupled out of the resonator/cavity 100. It should be understood that other types of beam splitters may be used, as well. Also, in principle the light may be coupled out anywhere in the cavity. The light out-coupled from the resonator 100 is denoted by B21, light traversing the polarization beam splitter 33 but not being deflected is denoted by B3. Such light, B3, then enters the spectral filter 41. Light B9 modified by the spectral filter 100 and/or light B10 modified by optional EOM 45 may impinge on a mirror 29 for deflection by a predetermined angle, such as 45 deg. Here, the angle of 45° is measured with respect to the angle of incident light beam. Such a mirror 29 may be used for making the setup within the resonator 100 more compact. Another mirror, denoted by 31, may be used light beam B8 exiting spectral filter 41.

Figure 2:
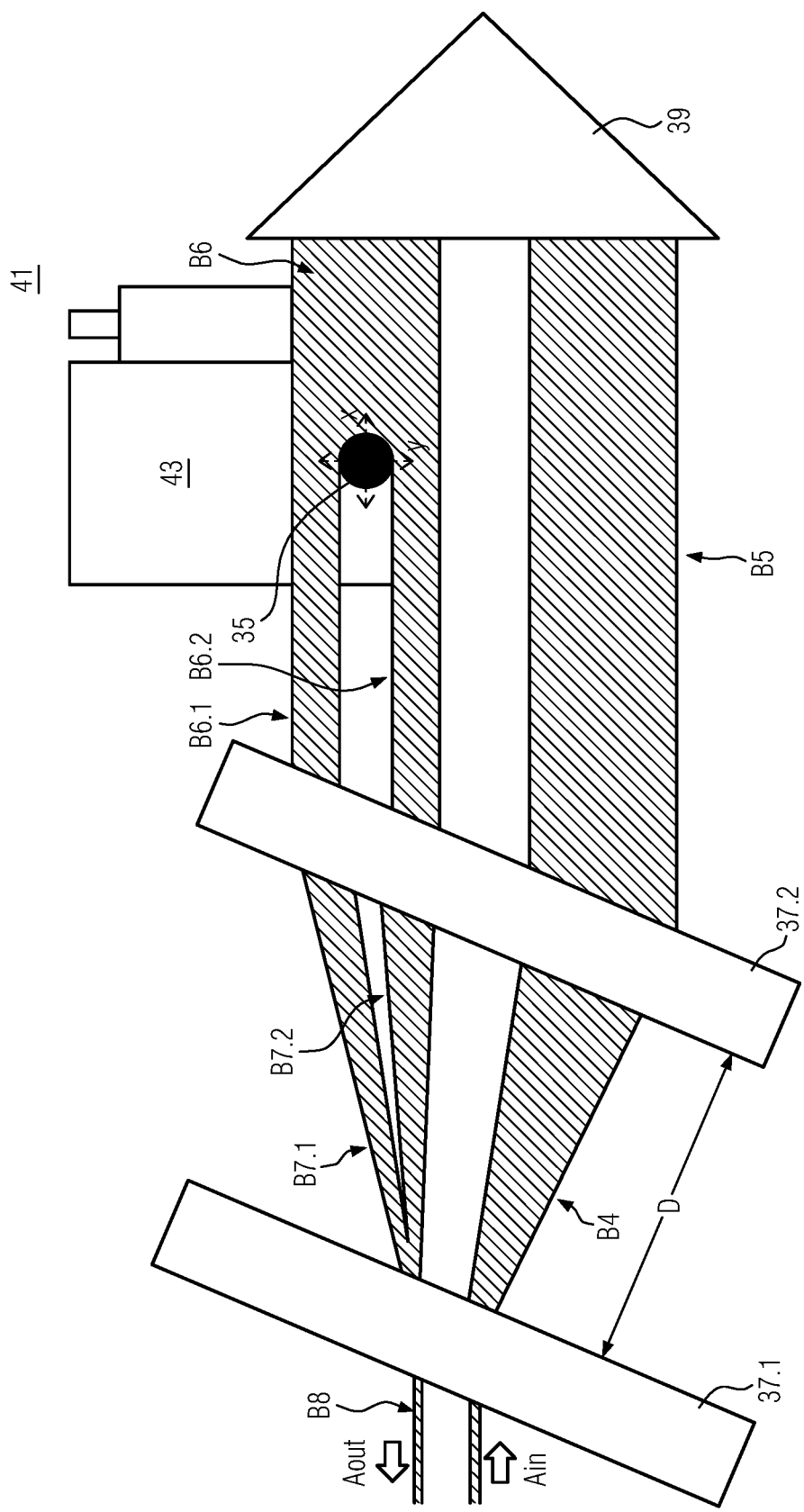
FIG. 2: An enlarged part of the system according to the first embodiment of the present disclosure.

In the following, spectral filter 41 as indicated in FIG. 1 should be further discussed. Said spectral filter 41 is also shown in FIG. 2 in an enlarged fashion, wherein the same reference numbers as in FIG. 1 are used. The spectral filter 41 comprises at least one attenuator for attenuating at least one wavelength band, respectively, located completely within the gain bandwidth of the laser system thereby providing at least two at least partially separated spectral regions of the laser spectrum, respectively. The attenuation may extend to a degree that a corresponding wavelength band is actually blocked. In other words, a correspondence between an attenuator and a wavelength band to be attenuated should be understood. This might extend to the degree of a blocking element corresponding to a blocked wavelength band. Thus, for one attenuator or blocking element, the respective wavelength band is located completely within the gain bandwidth of the laser system. If more than one wavelength band is attenuated or blocked, for instance by using more than one attenuator or blocking element, at least one of said blocked wavelength bands is located completely within the gain bandwidth of the laser system. It should be noted that all blocked wavelength bands may be located completely within the gain bandwidth of the laser system. Thus, attenuating and/or blocking parts of the laser spectrum but locating at least one of the attenuated or blocked parts completely within the gain bandwidth of the laser system thus provides that at least two at least partially separated spectral regions. These spectral regions may correspond to a corresponding number of maxima. In other words, edges of the spectrum should not be attenuated or blocked so as to curtail the spectral bandwidth. Thus, by attenuating or even blocking a part or parts of the spectrum, the laser spectrum can be intentionally manipulated. The attenuating or blocking may involve the central part of the gain bandwidth, i.e. the middle of the gain bandwidth, however, also non-central parts may be attenuated or blocked.

The spectral filter 41 of FIGS. 1 and 2 may comprise one or more of a grating compressor, dielectric mirrors, or absorptive filters (both not shown). In FIGS. 1 and 2, the spectral filter 41 comprises a grating compressor comprising a pair of gratings, 37.1 and 37.2, for spectrally dispersing the light in the resonator 100 and a reflector element 39 for reflecting the dispersed light back onto the gratings 37.1 and

37.2. It should be understood that it would be possible to use more than just one pair of gratings in the spectral filter. Also, the thickness of the gratings may be usually given by the production process of the gratings. Depending on the type of grating it may be 1 mm, or even thinner, or up to several mm in thickness. Also, there are reflective gratings, these are usually provided on relatively thick substrates having a thickness close to 10 mm. Also, in principle, a prism compressor could be used. As indicated in FIGS. 1 and 2, the spectral components of the intra-cavity light are spatially dispersed in the grating compressor. In general, this can be used to force the laser system to operate at a specific center wavelength. The inventors discovered that it is possible to generate multiple broadband but spectrally separated spectral regions of the laser spectrum. It is possible to independently mode-lock the laser within these spectral regions, hence creating, e.g., two mode-locked lasers at slightly different repetition rates. In more detail, FIGS. 1 and 2 disclose light beam B3 entering spectral filter 41 and thus the pair of gratings 37.1 and 37.2. Said light beam is then spatially dispersed after the first grating 37.1, cf. light beam B4, and after the second grating 37.2, light beam B5.

In FIG. 1, arrow A1 indicates the direction of light within the spectral filter 41. In FIG. 2, arrows $A_{in}$ and $A_{out}$ indicate the path of the light beams in and out of the spectral filter 41, respectively. In the setup of the spectral filter in FIG. 1, light is travelling counter clockwise. Light beam B5 may be reflected by reflector element 39 to become light beam B6. Reflector element 39 may be a retro-reflecting prism. Reflector element 39 may serve as a means for manipulating the beam height of the light beam and may directly include an attenuator. As indicated in FIGS. 1 and 2, light beam B6, being emitted from reflector 39 impinges on an attenuator or blocking element 35. As indicated in FIGS. 1 and 2, the attenuator or blocking element 35 may be of a cylindrical shape, or may have a wedge-shape or even the shape of a thin razor-blade. Said element 35 may even be only a small needle-shaped element, such as a cylindrical beam block, which is introduced into the collimated beam B6. It should be understood that for both illustrational as well as explanatory purposes, only one element 35 is depicted in FIGS. 1 and 2, however there may be more than one attenuation or blocking elements introduced into the light beam B6. Also, these one or more blocking elements may have the same or different shape and thickness. Also, it may be possible to use different geometrical shapes such as ellipsoidal or triangular shapes, for example. Instead of geometrical objects, even lines or patterns which are painted, scratched or otherwise inscribed on optical elements within spectral filter 41, might serve the same purpose of blocking or attenuating specific frequency bands.

As shown in FIGS. 1 and 2, the attenuation or blocking element 35 may be translated by using a translating element 43. This translating element 43 might help to finely tune the position of the element 35 with respect to the beam. As indicated in FIG. 2, the translation of element 35 may be performed in a direction substantially perpendicular to the beam axis of the light beam B6. This direction is denoted by y in FIG. 2. But it may be also possible to additionally translate the element 35 in a direction substantially parallel to the beam axis of the light beam, as denoted by x in FIG. 2. Due to the spatial distribution of the spectrum, the spectrum can be manipulated by translating the element 35, e.g. the needle-shaped beam block. Thus the beam B6 is manipulated to become two beams, B6.1 and B6.2, after the beam B6 hits the element 35. Said light beams B6.1 and B6.2 then impinge, again onto the pair of gratings 37.2 and 37.1, now in reverse order. Light between gratings 37.2 and 37.1 is then denoted as B7.1 and B7.2. This may then serve to obtain a compressed light beam B8, again, after exiting the grating compressor and thus exiting the spectral filter 41 to be then further guided towards re-entering the gain medium 17, again, i.e. re-entering the fiber part 100.F of the resonator 100. As indicated in FIG. 2, the distance d between the gratings 37.1 and 37.2 may be adapted. Also the thickness of the attenuating or blocking element 35 may be adjusted. Both adjustments serve to improve the operation of the laser. Having manipulated the light beam B6 to become light beams B6.1 and B6.2, the oscillator will eventually simultaneously run in continuous wave at two different central wavelengths, i.e. each having their own central wavelength. These two lasers are mode-locked by manipulating the intensity losses, e.g. by polarization manipulation as indicated above and by fine-tuning the beam block position, for instance by using the translating element 43. This means that these two lasers are mode-locked one by one but will then run in parallel, i.e. simultaneously.

The two lasers will have different repetition rates; e.g. $f_{rep1}$ and $f_{rep2}$, as is shown in a somewhat pictorial fashion in FIG. 1, where the two lasers are denoted by reference numbers 47.1 and 47.2, respectively. Mirror 47 may be used if needed. The different repetition rates will depend on the dispersion of the cavity. These two lasers then present two separated combs or a separated dual comb. It should be repeated, again, that more than two combs may have been created corresponding to more than two obstacles in the spectral filter, here more than two elements 35, as was discussed, above. In other words, more than two combs may have been created as a result of introducing more than one obstacle. With respect to laser spectroscopy, however, these two or more combs may be further manipulated and in particular should be spectrally overlapped to provide a spectrally overlapping dual comb or multicomb, respectively, for spectroscopic applications. The spectral overlapping of the two combs 47.1 and 47.2 is achieved by using a non-linear medium such as a non-linear fiber 45. Instead of a non-linear fiber, the non-linear medium may also comprise at least one of a crystal, a fiber, a glass, or a gaseous medium. As indicated in FIG. 1, light beam B24 entering the non-linear fiber 45 will become modified light beam B25, representing overlapped dualcomb laser having an overlapped dualcomb spectrum beam 57, which again is depicted in a pictorial fashion. A mirror 42 may be used if needed.

Further, before entering the non-linear medium 45, the light B21 that exited from the cavity may be further stretched or compressed as needed by using another stretcher/compressor element 55, e.g. for time compression of the laser beam B21. This will then produce light beam B24, which by means of element 55 may also be stabilized. Element 55 comprises another grating compressor comprising a pair of gratings, 55.1 and 55.2, as well as a reflector 53. B22 denotes the beam in between the gratings 55.1 and 55.2, respectively. B23 denotes the beam between the grating compressor and the reflector. These elements may then serve, again, for stretching and compressing the light beam, similar to the grating compressor with elements 37.1 and 37.2, see description above.

Figure 3:
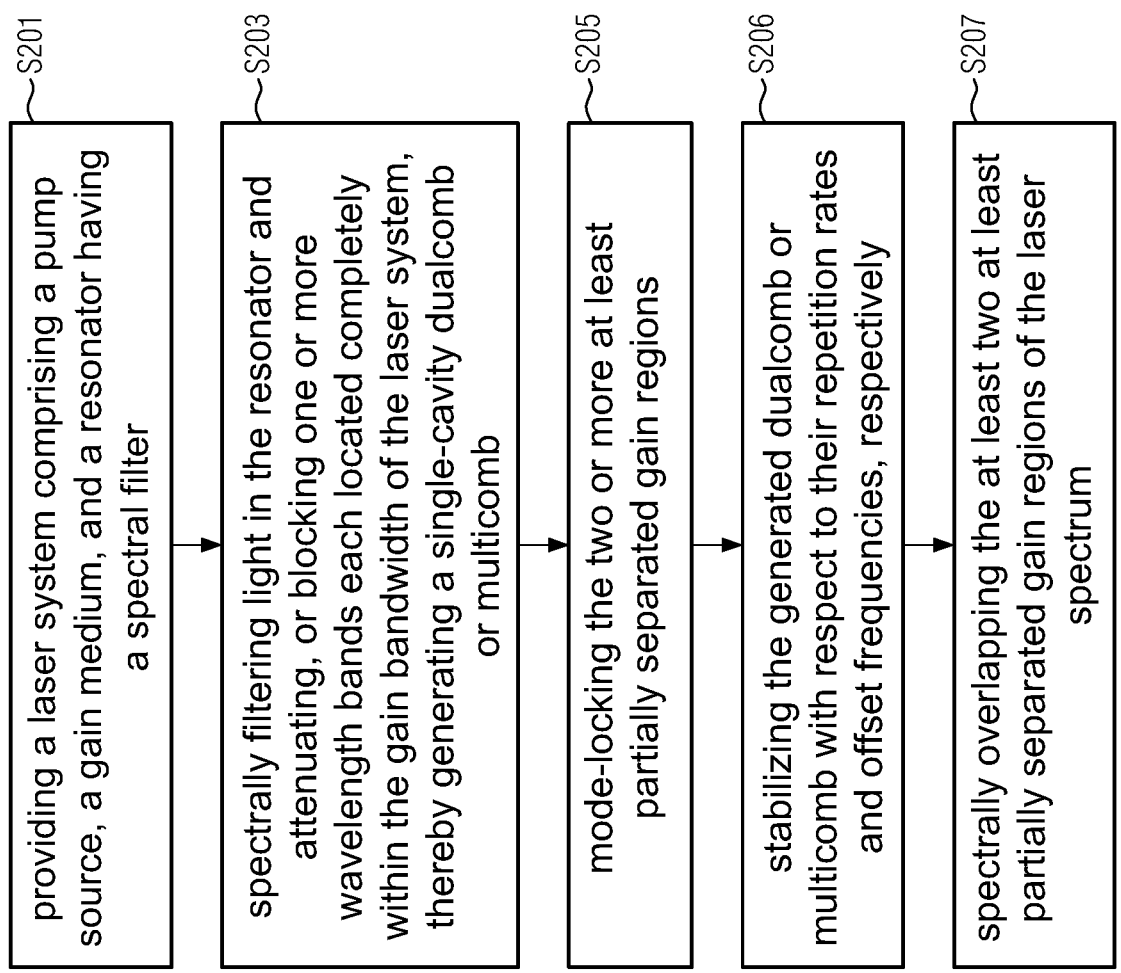
FIG. 3 A method for generating a single-cavity dualcomb or multicomb for laser spectroscopy system, corresponding to the first embodiment of the present disclosure.

FIG. 3 illustrates the basic steps of the corresponding method for generating a single-cavity dualcomb or multicomb for laser spectroscopy. In step S201, it is provided a laser system comprising a pump source, a gain medium, and a resonator having a spectral filter. In step S203. The pump source, the gain medium, the resonator and the spectral filter may be of the kind as discussed above. Step S203 further indicates spectrally filtering light in the resonator, such as the resonator 100, and attenuating, or blocking one or more wavelength bands at least one of which being located completely within the gain bandwidth of the laser system. Thus, two or more at least partially separated spectral regions are provided. Thus, it is obtained a spectrally overlapped dualcomb or multicomb, respectively. Step S205 further indicates the step of mode-locking the two or more at least partially separated spectral regions. The method as illustrated in FIG. 3 may then further comprise subsequent Step 206 following Step 205, Step 206 including stabilizing the generated dualcomb or multicomb with respect to their repetition rates and offset frequencies, respectively. Further, the method as illustrated in FIG. 3 may then further comprise subsequent Step 207 following Step 206. Step S207 indicates spectrally overlapping the at least two at least partially separated spectral regions of the laser spectrum. Thus, said spectral overlapping, as discussed with respect to FIG. 1, is achieved by using a non-linear medium, e.g. at least one of a crystal, a fiber, a glass, or a gaseous medium, the at least two at least partially separated spectral regions of the laser spectrum. Thus, it is obtained a spectrally overlapped dualcomb or multicomb, respectively.

Figure 4:
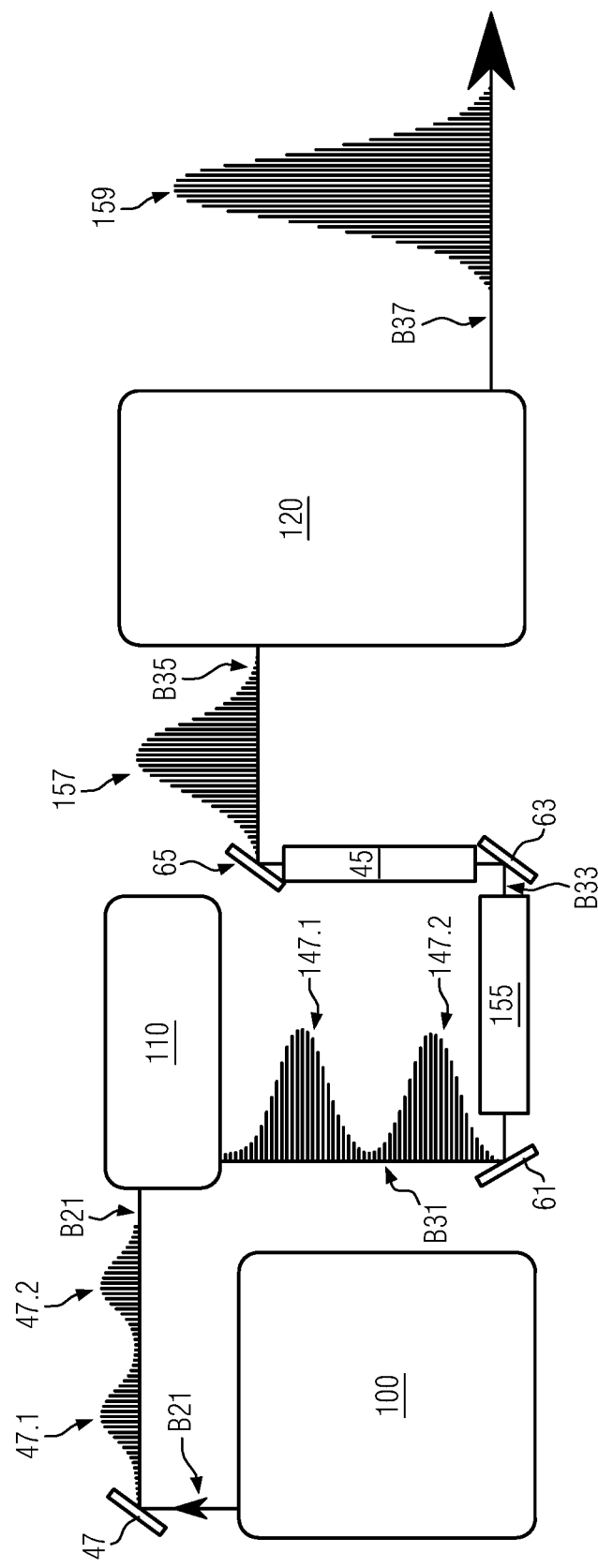
FIG. 4 A system according to a further embodiment of the present disclosure.

FIG. 4 illustrates a further embodiment according to the present disclosure. FIG. 4 discloses an overview of a simple complete system comprising a simplified version of the described dual-comb laser system similar to the laser system 200 of FIGS. 1 and 2, a pre-amplifier 110, a compressor, a non-linear medium 45 and a subsequent main amplifier stage. In more detail, FIG. 4. discloses a resonator 100 which corresponds to the resonator 100 of FIG. 1. Also two separated combs 47.1 and 47.2 are indicated, similar as in FIG. 1. Light beam B21 may then be further amplified by the optical pre-amplifier 110 based on the same or a different active material as the gain medium thereby generating pre-amplified combs 147.1 and 147.2, respectively, as light beam B31. Said pre-amplified laser combs 147.1 and 147.2 then impinge on another stretcher/compressor element 155, here serving the purpose of pulse compression for each of the combs 147.1 and 147.2, respectively. The stretcher/compressor element 155 may be another grating compressor similar as grating compressor 55 of FIG. 1. The stretcher/compressor element 155 may produce modified light beam B33 comprising two modified pre-amplified combs, originating from combs 147.1 and 147.2, respectively. Then, after these preparatory steps, light beam B33 enters non-linear medium 45. Said non-linear medium 45 may be the same as non-linear medium 45 of FIG. 1. Using mirrors 61, 63 and 65 as needed for compact setup of the system, an overlapped dualcomb 157 is generated by spectrally overlapping the two combs in the non-linear medium 45. Here, a compact setup should be understood as a setup realizing a compact implementation of the system. Said overlapped dualcomb 157, represented by light beam B35 may then be further amplified by using optical amplifier 120, eventually and amplified overlapped dualcomb 159 is achieved, represented by light beam B37 for further spectroscopic applications such as mid-IR or XUV dual frequency comb generation.

Figure 5:
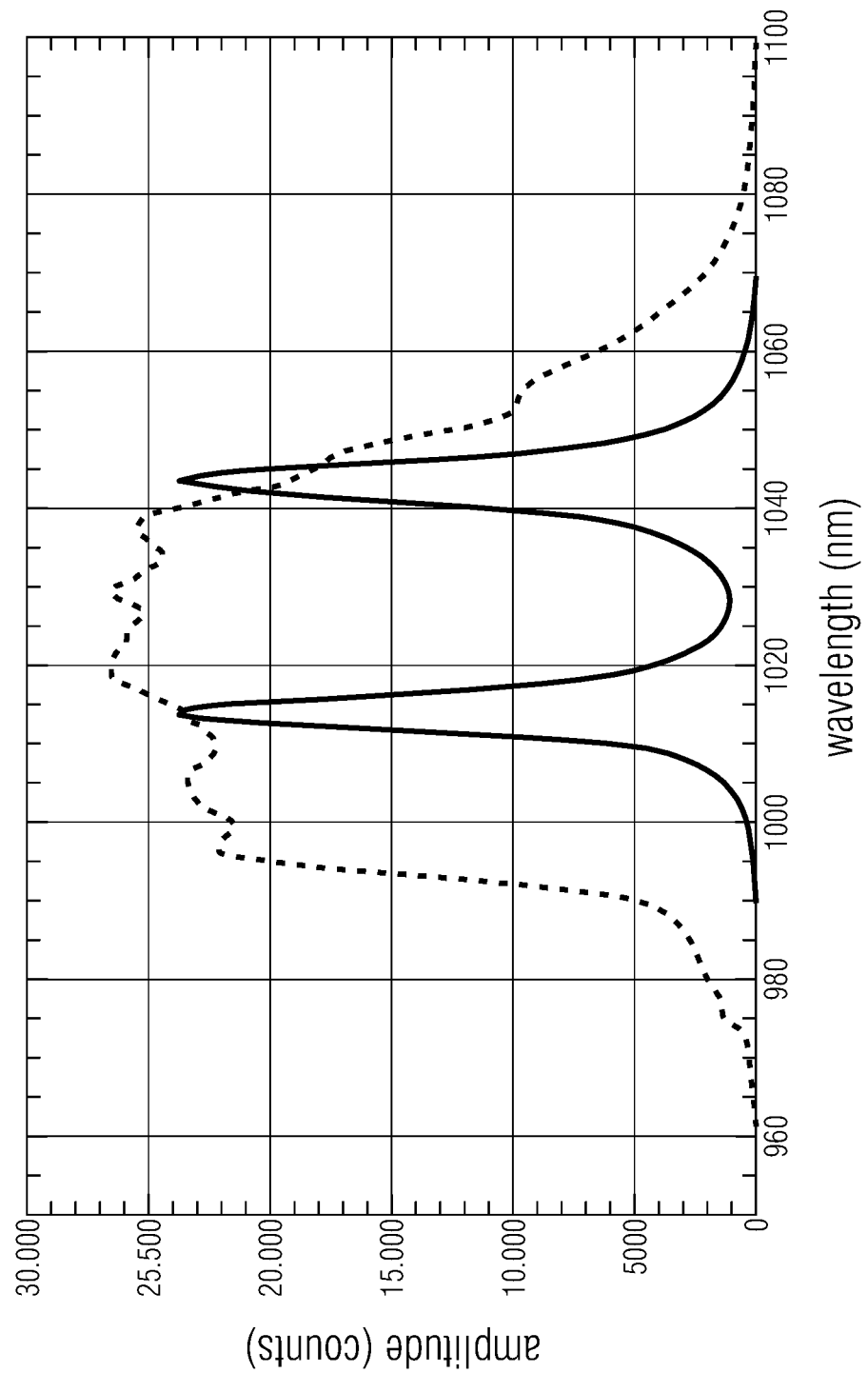
FIG. 5 A spectrum of an NPE laser in single and in dualcomb operation.

As an example, to demonstrate the above-discussed method and the principal setup discussed with respect to the above figures, an NPE-laser was built with a repetition rate of about 80 MHz. The spectrum of this laser can be seen in FIG. 5, indicated by the dashed line. Here, the spectral width corresponds to a bandwidth exhibiting a limited pulse duration, i.e. a minimum pulse duration of less than 100 fs, e.g. about 40 fs. Due to limitations in pump power, the repetition rate of the laser was decreased to about 20 MHz. This reduction allows the system to maintain sufficient peak power for simultaneous mode-locking of the two different pulse trains. But it should be appreciated that in fact these were the only limitations. Namely, the only limitation for the repetition rate is given by the available pump power and the corresponding doping concentration, which is dependent on the length of the gain fiber. In this example, a single mode fiber similar to the single mode fibers F2 and F3 of FIG. 1, was inserted between collimator 21.2 and the WDM 15 as long as necessary to smoothly splice it to the WDM 15. Otherwise, no additional length of said fiber was added so as to reduce or avoid spectral broadening due to self-phase modulation and hence spectral coupling between the two distinct spectral regions, see FIG. 1, and FIG. 4, respectively. By mode-locking the NPE laser and simultaneous adjustment of the blocking element 35, both spectral ranges were independently mode-locked at the same time, see FIG. 1, and FIG. 4, respectively. The bandwidth limited pulse duration of the individual pulse trains was about 200 fs. The corresponding spectrum can be seen in FIG. 5, indicated by the solid line. In other words, FIG. 5 shows the spectrum of an NPE laser system in single and dual-comb operation. Whereas for stable operation and best noise properties, NPE lasers often are operated around zero dispersion, in this case, a slightly positive or negative dispersion allows for stable and reliable self-starting pulse formation. Thus, in fact, a small dispersion range around zero dispersion allows for the realization of different cavity lengths for the different center wavelengths, without significant deterioration of the noise levels. This small dispersion range applies to the net dispersion of the entire cavity. This small dispersion range may have a width of ±2000 fs$^2$. Since the two combs originate from the same cavity, they share the same common noise properties. This might help in achieving stabilization of both combs together while stabilizing only one of the two combs. In order to eventually produce a spectrum usable for dual-comb-spectroscopy, spectral overlap needs to be provided. This is achieved by sending the light through a highly non-linear fiber 45. Due to the optical beating of the two combs the carrier-envelope-offset frequencies may be measured, i.e. by measuring $\Delta f_{CEO}$ and subsequently stabilized without the need of further equipment, such as a f to 2f interferometer.

Dual combs are a powerful tool for spectroscopy. By using a dual comb there is no need for any complicated and expensive detector assemble like a virtually imaged phase array or a Fourier transform spectrometer. A simple photo diode is sufficient. A clear drawback however is the complicate and expensive oscillator design or the need for two mutually coherent optical frequency combs, OFC. Here an alternative approach is demonstrated. In a powerful and easily implementable method a dualcomb or multicomb is generated from a single resonator. By manipulating the cavity losses for different spectral parts of the gain bandwidth, two frequency combs originating from the same NPE laser are demonstrated. The resulting pulse trains support a pulse duration of about 200 fs. By working in a non-zero dispersion regime of the entire cavity, a difference in the repetition rate of about 10 kHz down to 1 kHz was achieved. Optical beating and subsequent generation of a mixed-down RF-comb can be observed after spectral broadening in a highly nonlinear fiber. After this stage, a spectral overlap of the two optical frequency combs is established, generating an ideal dualcomb-seed-laser for dualcomb-spectroscopy systems. This dualcomb-seed laser may be amplified and used for nonlinear frequency conversion into the mid infrared, MIR; near infrared, NIR; or ultraviolet and extreme ultraviolet regimes, UV and XUV. It is especially in these challenging spectral regions that the full advantage of this approach is appreciated. In the mid-IR spectral region, a wide spectrum will be generated, typically with the help of an optical parametric oscillator or difference frequency generation system. Here, the drawback of a reduced spectrum is directly compensated by subsequent wavelength-conversion schemes and the advantage of easily obtainable comb-mode-resolved dualcomb-spectroscopy remains a clear advantage. In the XUV-spectral region measurements of broadband absorption spectra are inherently difficult due to the lack of highly reflecting optics and transparent materials. This makes established techniques like FTS challenging to implement. A possible solution could be to extend dualcomb-technique to the XUV, regime. In the XUV spectral region light is typically produced by cavity enhanced nonlinear high harmonic generation. This can be done based on a dualcomb-seed laser and a fiber amplifier scheme. A possible scenario would be to keep the difference in repetition rates small enough such that both combs can be coupled into the enhancement cavity which will be designed at a reduced finesse Whereas the above example demonstrated the method for an NPE laser, the underlying method may be extended to any kind of passively modelocked laser. This is of special interest also for fiber laser setups which have excellent stability and noise performance that are nearly independent of the environment. Thus, this invention may provide a new generation of dual frequency combs that are usable outside a laboratory environment. Such systems would be an excellent seed laser for an amplifier setup to obtain a high average power dual comb.

Summarizing, the present disclosure discloses a laser system and a corresponding method for generating a single-cavity dualcomb or multicomb for laser spectroscopy, wherein a manipulation of the laser spectrum is achieved by intentionally creating losses or attenuation within the resonator. Said losses or attenuation are applied typically for small wavelength bands within the resonator, i.e. the laser gain bandwidth. The suppressed or attenuated wavelength bands lie completely within the laser gain bandwidth. Often, the central part corresponding to the middle of the amplification range of the gain medium, will be suppressed or blocked. After introducing these losses or selective attenuation, the laser in principle is ready to start lasing in two different wavelength bands, each having their own, different, i.e. distinct, central wavelengths. Thus, two lasers at two different wavelengths are generated.

These two lasers are modelocked. This means, that simultaneously very short pulses having bandwidth limited pulse durations of less than 1 ps are generated from the first and the second laser, respectively. Thereby, a frequency comb may be generated.

Typically, dispersion of the laser, i.e. the cavity, is kept at a slightly positive or negative value. This has nearly the same effect as providing a different resonator length for different wavelengths. Thus, the optical path length within the resonator is different for each of the two lasers even though their light passes through the same optical elements.

The repetition rate of the laser may be determined by taking into account the optical path length. Thus, two separate lasers, say laser 1 and laser 2, are obtained from the same resonator having different spectra and different repetition rates. In particular, two frequency combs are generated having different spacing of their respective single comb modes.

The laser pulses resulting from lasers 1 and 2 may be further amplified and may be further compressed in the time domain. This may serve to further enhance the peak power of the resulting laser.

The frequency combs resulting from lasers 1 and 2, respectively, are coupled into a non-linear medium, such as a non-linear fiber. This fiber serves to broaden and eventually overlap the individual combs, i.e. the spectra of lasers 1 and 2. Further stabilizing and tuning of the repetition rate may further improve the properties of the resulting overlapped dual comb. Said resulting dual comb may be further amplified or transposed into different wave length ranges.

The effect of the method above is a substantially reduced complexity of the setup and better stability. Also noise behavior may improve since both lasers pass through the same elements thereby accumulating the same noise, thus benefiting from common-mode rejection. This accumulated noise may then be subtracted from the resulting laser so as to achieve a substantial reduction of the noise.

The invention claimed is:

1. A method for generating a single-cavity dualcomb or multicomb for laser spectroscopy, the method comprising the steps of:
   providing a laser system comprising a pump source, a gain medium, and a resonator having a spectral filter;
   spectrally filtering, by the spectral filter, light in the resonator and attenuating, by the spectral filter, one or more wavelength bands at least one of which being located completely within the gain bandwidth of the laser system such that two or more at least partially separated spectral regions are provided; and
   mode-locking the two or more at least partially separated spectral regions.

2. The method according to claim 1, further comprising the step of stabilizing the generated dualcomb or multicomb with respect to their repetition rates and offset frequencies, respectively.

3. The method according to claim 1, further comprising the step of spectrally overlapping, by a non-linear medium comprising at least one selected from the group of a crystal, a fiber, a glass, and a gaseous medium, the at least two at least partially separated spectral regions of the laser spectrum, thereby obtaining a spectrally overlapped dualcomb or multicomb, respectively.

4. The method according to claim 1, wherein the step of mode-locking the two or more at least partially separated spectral regions further comprises manipulating intensity losses of the light dependent on its peak intensity; and
   wherein manipulating intensity losses comprises: manipulating the polarization of the light out-coupled from the gain medium before entering the spectral filter, and manipulating the polarization of the light manipulated by the spectral filter before re-entering the gain medium.

5. The method according to claim 1, wherein the spectral filter comprises at least one selected from the group of a grating compressor, a dielectric mirror, a fiber Bragg grating, a prism compressor, and an absorptive filter.

6. The method according to claim 1, wherein the step of spectrally filtering comprises spatially dispersing, by the spectral filter, the light in the resonator, and wherein the spectral filter comprises at least one selected from the group of a grating compressor and an absorptive filter.

7. The method according to claim 1, further comprising the steps of:
- modulating the carrier envelope of the laser spectrum;
- unidirectional feeding the light back into the gain medium; and
- amplifying the light out-coupled from the resonator and compressing the amplified light in the time domain by another grating compressor.

8. The method according to claim 1, wherein the gain medium is a doped fiber, doped crystal or doped glass, and
- wherein the gain medium is doped by one of Yb, Er, Ti, Ho, Nd, Pr, Tm; and wherein the laser system comprises a nonlinear polarization evolution, NPE laser, a nonlinear amplifying loop mirror, NALM, laser.

9. A laser system for generating a single-cavity dualcomb or multicomb for laser spectroscopy, comprising:
- a pump source, a gain medium and a resonator;
- the resonator comprising a spectral filter for spectrally filtering light in the resonator and for attenuating one or more wavelength bands at least one of which being located completely within the gain bandwidth of the laser system such that two or more at least partially separated spectral regions are provided; and
- means for mode-locking the two or more at least partially separated spectral regions.

10. The laser system according to claim 9, further comprising means for stabilizing the generated dualcomb or multicomb with respect to their repetition rates and offset frequencies, respectively.

11. The laser system according to claim 9, further comprising a non-linear fiber for spectrally overlapping the at least two at least partially separated spectral regions of the laser spectrum, thereby obtaining a spectrally overlapped dualcomb or multicomb, respectively.

12. The laser system according to claim 9,
- wherein the gain medium is a doped fiber, doped crystal or doped glass, and wherein the gain medium is doped by one of Yb, Er, Ti, Ho, Nd, Pr, Tm; and
- wherein the laser system comprises one of an ultrashort pulse fiber laser based on the Kerr effect comprising a nonlinear polarization evolution, NPE, laser, a nonlinear amplifying loop mirror, NALM, laser or a Kerr-lens mode-locking, KLM, laser, or a saturable absorber comprising a SESAM or graphene modelocked laser.

13. The laser system according to claim 9, wherein the means for mode-locking the two or more at least partially separated spectral regions comprises:
- a manipulator for manipulating intensity losses of the light dependent on its peak intensity; wherein the manipulator comprises:
  - a first polarization manipulator for manipulating the polarization of the light out-coupled from the gain medium before entering the spectral filter, and a second polarization manipulator for manipulating the polarization of the light manipulated by the spectral filter before re-entering the gain medium;
  - or a saturable absorber to establish mode-locking;
  - or an aperture and a Kerr-lens to establish Kerr-lens mode-locking.

14. The laser system according to claim 9, wherein the spectral filter comprises at least one attenuator for attenuating a wavelength band located completely within the gain bandwidth of the laser system thereby providing at least two at least partially separated spectral regions of the laser spectrum, respectively.

15. The laser system according to claim 9; wherein the spectral filter comprises at least one selected from the group of a grating compressor, a dielectric mirror, and an absorptive filter; and
- wherein the grating compressor comprising a pair of gratings for spectrally dispersing the light in the resonator and a reflector for reflecting the dispersed light back onto the gratings.

16. The laser system according to claim 9, further comprising:
- an electro optical modulator, EOM, for modulating the carrier envelope and/or the repetition rate of the laser spectrum; and
- at least one Faraday isolator for unidirectional feeding the light back into the gain medium; and an amplifier for amplifying the light out-coupled from the resonator and another grating compressor for compressing the amplified light in the time domain.

17. The method according to claim 2, wherein the step of mode-locking the two or more at least partially separated spectral regions further comprises manipulating intensity losses of the light dependent on its peak intensity; and
- wherein manipulating intensity losses comprises: manipulating the polarization of the light out-coupled from the gain medium before entering the spectral filter, and manipulating the polarization of the light manipulated by the spectral filter before re-entering the gain medium.

18. The method according to claim 1, wherein the step of mode-locking the two or more at least partially separated spectral regions further comprises manipulating intensity losses of the light dependent on its peak intensity; and
- wherein manipulating intensity losses comprises: manipulating the polarization of the light out-coupled from the gain medium before entering the spectral filter, and manipulating the polarization of the light manipulated by the spectral filter before re-entering the gain medium.

19. The method according to claim 2, wherein the spectral filter comprises at least one selected from the group of a grating compressor, dielectric mirror, fiber Bragg grating, prism compressor, and absorptive filter.

20. The method according to claim 3, wherein the spectral filter comprises at least one selected from the group of a grating compressor, dielectric mirror, fiber Bragg grating, prism compressor, and absorptive filter.

* * * * *